H. A. PERKINS.
JOURNAL BOX.
APPLICATION FILED DEC. 10, 1908.
949,910.
Patented Feb. 22, 1910.
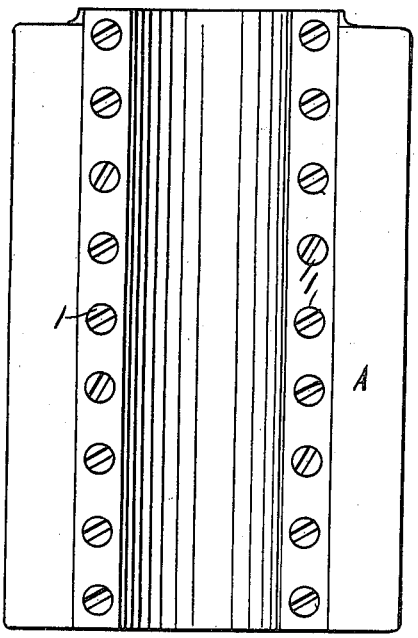
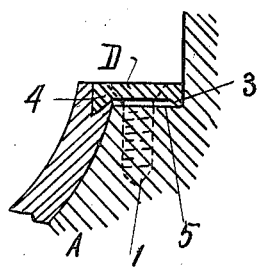
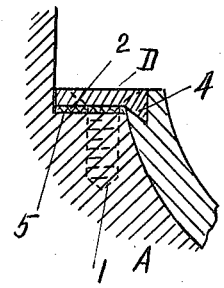
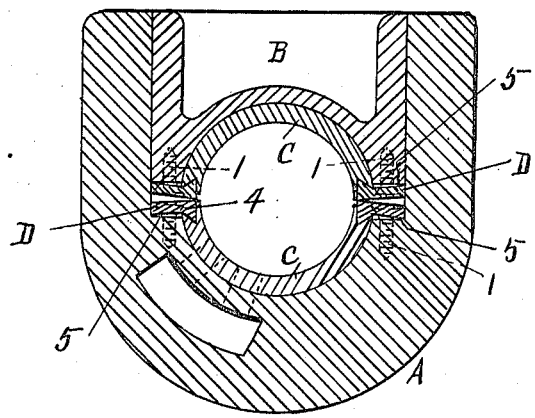
Witnesses
C. M. Catlin.
H. L. Gould
Inventor
H. A. Perkins,
By Benj. R. Catlin
Attorney

UNITED STATES PATENT OFFICE.

HIRAM A. PERKINS, OF ROCHESTER, NEW YORK, ASSIGNOR TO AMERICAN WOOD WORKING MACHINERY CO., OF ROCHESTER, NEW YORK, A CORPORATION OF PENNSYLVANIA.

JOURNAL-BOX.

949,910.

Specification of Letters Patent. Patented Feb. 22, 1910.

Application filed December 10, 1908. Serial No. 466,877.

*To all whom it may concern:*

Be it known that I, HIRAM A. PERKINS, of Rochester, in the county of Monroe and State of New York, have invented a new and useful Improvement in Journal-Boxes, of which the following is a specification.

My improvement relates to that class of journal boxes which require a separable lining which can be readily replaced when worn out; and it consists mainly in a novel means of securing the lining, which is preferably made in two or more longitudinal sections, into the bore or recess of the box.

In the drawing Figure 1 is a plan view of one type of divided box showing the cap or top part removed. Fig. 2 is a cross section of the same showing the cap in place. Figs. 3, 4 and 5 show details and modifications.

A represents the main portion of a journal box having a cap B, fitted into it; this box is of the side flanged type, but my invention is equally applicable to an ordinary half box and cap as well as to other forms of journal boxes which are divided for the purpose of taking up wear.

C is a lining forming the bearing for the journal, and is made preferably in two parts longitudinally, but if required can be made in as many parts as it is desirable to separate the box into. The material for the linings may be brass, Babbitt metal or any suitable metal either cast to size or machined. I prefer that the parts of this lining project slightly beyond the division lines 5 of the box as indicated in Figs. 3 and 4, and clamping plates D are provided pressing against the edges of the lining sections, and secured to the adjacent parts of the box and cap (or box sections) by means of screws 1. It will be seen that the clamping plates may lie in a rabbet formed in the edges of lining sections, so that practically the entire inner surface of the lining can be utilized for bearing purposes. The screws 1, and clamps D, force the lining sections against the interior periphery of the box, so as to produce rigid contact and consequently a solid backing for the lining. This is an important result especially for journals running at a high speed, where vibration must be eliminated.

In order to further insure such rigid contact of the box, I provide a wedge-like or beveled lip 4, on one edge of the clamping plates D, which fits into a corresponding groove in the edge of the lining sections C. When therefore the plate D is forced down by the screws 1, the action of the beveled lip 4 is to wedge or thrust the lining radially, or nearly so, into the bore or recess of the box, and thus produce rigid contact around the peripheral surfaces.

It will be observed that by means of the projection of the edges of the lining beyond the division lines of the box, I secure a clearance between the plates D, and the ledge 5, or parting line of the box, as indicated in Figs. 3 and 4. This is for the purpose of insuring clamping pressure on the lining sections, and I have indicated in Fig. 2 that the plates D may be pitched slightly away from a radial line so as to have a bearing on the parting ledge 5 of the box at one edge, and on the lining section at the opposite edge. Other means of utilizing this clearance are shown in Fig. 3 where a slight bearing lip 3 is provided, forming a fulcrum upon which the clamping plate is supported along one edge while the other edge is forced against the lining section by the screws.

In Fig. 4 a compressible or elastic strip is shown under the clamping plate, thus partially supporting said plate, but still permitting it to press hard upon the lining section when the screws 1 are forced in. It is of course possible to so fit the lining sections and clamping plates to their respective parts of the box, that the clearance just described may not be actually necessary to permit the clamping plates to perform their function, but in practice this clearance is desirable for the purpose of providing against slight inaccuracies of fitting and insuring the actual contact of the lining and the box by the clamping pressure.

I have shown the lining space in the box as circular in section and the lining as annular, because boring the box and turning the lining or casting it in an annular mold made in sections to correspond with the dimensions of the box, is apparently the most practical method of producing the complete box; but other forms of lining space, either machined or left rough from the mold or forge, or of polygonal or square cross-section, may be used in connection with my invention, the lining sections in such cases being cast into the box or otherwise roughly fitted.

What I claim as my invention and desire to secure by Letters Patent is:

1. In a journal box comprising separable parts having plate-supporting ledges, detachable lining sections in said parts of the box, clamping plates on said ledges, an edge of each clamping plate bearing on an edge of a lining section while the main body of each plate is separated from its ledge, and screws pressing said plates against the lining sections, whereby the plates may press lining sections into rigid contact with the interior of the box notwithstanding variations in the lining sections or in the box.

2. In a journal box comprising separate parts each having ledges for supporting clamping plates, lining sections in the parts of the journal box, clamping plates supported on said ledges and bearing on proximate edges of the lining sections, there being a lip at an edge of each clamping plate on the ledge side thereof whereby the body of each plate stands away from its ledge and means for securing the clamping plates to the ledges and firmly pressing the lining sections against the inner surface of the parts of the box notwithstanding variations in the sizes of such parts.

3. A journal box comprising separable parts having plate-supporting ledges, detachable lining sections in the parts of the box, clamping plates on the ledges, the clamping plates each having a projecting lip, or lips, on the side facing its ledge, one edge of each plate normally bearing on an edge of a lining section, the bodies of said plates adjacent such edges being separated from the supporting ledges to provide adjustment against variations in lining sections and boxes, and plate-clamping screws.

4. In a journal box comprising separate parts, removable linings made in sections longitudinally, edges of said sections having bevel grooves, clamping plates having beveled lips fitting into the corresponding grooves in the edges of the lining sections, means for securing said clamping plates to the parts of the box, whereby the sections are forced radially or approximately so, against the inner periphery of the box, for the purposes set forth.

5. In a journal box comprising separate parts, removable lining sections with their longitudinal edges projecting slightly beyond the division lines of the box, clamping plates for securing said linings in their respective recesses, means for securing said clamping plates to the parts of the box, there being a clearance under the clamping plates, whereby pressure is exerted mainly on the lining sections, for the purposes set forth.

6. A journal box comprising a plurality of separate parts, a lining for each part of the box, adjustable clamping plates with beveled parts bearing on the lining sections in approximately a radial direction, the edges of the lining in each part of the box having surfaces coöperating with said beveled parts of the clamping plates, and means for securing such plates to their respective parts of the box.

In testimony whereof I have signed my name to this specification in the presence of two subscribing witnesses.

HIRAM A. PERKINS.

Witnesses:
G. C. SOUTHARD,
R. J. McKELVEY.